(12) United States Patent
Galehr et al.

(10) Patent No.: US 11,479,290 B2
(45) Date of Patent: Oct. 25, 2022

(54) STEERING SYSTEM HAVING A RELUCTANCE BRAKE

(71) Applicants: thyssenkrupp Presta AG, Eschen (LI); thyssenkrupp AG, Essen (DE)

(72) Inventors: Robert Galehr, Schaanwald (LI); Arne Schacht, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 195 days.

(21) Appl. No.: 16/962,266

(22) PCT Filed: Jan. 30, 2019

(86) PCT No.: PCT/EP2019/052159
§ 371 (c)(1),
(2) Date: Jul. 15, 2020

(87) PCT Pub. No.: WO2019/149713
PCT Pub. Date: Aug. 8, 2019

(65) Prior Publication Data
US 2021/0061345 A1    Mar. 4, 2021

(30) Foreign Application Priority Data
Feb. 1, 2018  (DE) ...................... 10 2018 102 216.6

(51) Int. Cl.
*B62D 5/00* (2006.01)
(52) U.S. Cl.
CPC ............. *B62D 5/006* (2013.01); *B62D 5/001* (2013.01); *B62D 5/005* (2013.01)

(58) Field of Classification Search
CPC ......... B62D 5/001; B62D 5/005; B62D 5/006
See application file for complete search history.

(56) References Cited

U.S. PATENT DOCUMENTS

| 6,148,967 A | 11/2000 | Huynh |
| 6,612,392 B2 | 9/2003 | Park |
| (Continued) | | |

FOREIGN PATENT DOCUMENTS

| CN | 103597718 A | 2/2014 |
| CN | 105849432 A | 8/2016 |
| (Continued) | | |

OTHER PUBLICATIONS

English Translation of International Search Report issued in PCT/EP2019/052159, dated Apr. 16, 2019.

*Primary Examiner* — Kevin Hurley
(74) *Attorney, Agent, or Firm* — thyssenkrupp North America, LLC (57) ABSTRACT

A steering system for motor vehicles, including a steering actuator which acts on the steered wheels, is electronically controlled based on a steering request and acts on the steered wheels via a steering gear, and an actuator device which transmits reactions to a steering shaft connected to the steering wheel. The steer-by-wire steering system has a holding brake which can be activated electrically and has two positions; a holding position and an open position. The holding brake is configured to block rotation of the steering shaft in the holding position when a predefined rotational angle of the steering shaft is exceeded, and to release rotation of the steering shaft in the open position.

20 Claims, 6 Drawing Sheets

(56) References Cited

U.S. PATENT DOCUMENTS

| | | | |
|---|---|---|---|
| 6,899,196 B2 * | 5/2005 | Husain | B62D 6/008 |
| | | | 180/402 |
| 7,045,985 B2 * | 5/2006 | Huang | B60L 7/16 |
| | | | 318/362 |
| 2003/0230448 A1 | 12/2003 | Guldner | |
| 2004/0016591 A1 | 1/2004 | Kojo | |
| 2004/0262071 A1 | 12/2004 | Duits | |
| 2005/0194923 A1 | 9/2005 | Huang et al. | |
| 2006/0220393 A1 | 10/2006 | Dimig | |
| 2007/0023244 A1 | 2/2007 | Carlson | |
| 2010/0122881 A1 | 5/2010 | Carlson | |
| 2014/0111045 A1 | 4/2014 | Kappel | |
| 2016/0377138 A1 | 12/2016 | Loens | |
| 2017/0320515 A1 | 11/2017 | Levesque | |
| 2017/0363159 A1 | 12/2017 | Meszaros | |
| 2021/0044192 A1 * | 2/2021 | Galehr | H02K 3/28 |

FOREIGN PATENT DOCUMENTS

| | | | | |
|---|---|---|---|---|
| DE | 11 32 644 B | 7/1962 | | |
| DE | 103 34 058 A | 2/2004 | | |
| DE | 10 2004 050 014 A | 6/2005 | | |
| DE | 602 02 074 T | 12/2005 | | |
| DE | 10 2008 045 195 A | 3/2010 | | |
| DE | 10 2013 014 135 B | 7/2014 | | |
| DE | 10 2013 014 138 B | 12/2014 | | |
| DE | 10 2013 014 134 A | 2/2015 | | |
| DE | 102004050014 B4 * | 1/2016 | | B62D 5/005 |
| EP | 1 375 299 A | 1/2004 | | |
| GB | 03910 A | 3/2015 | | |
| JP | 2008-285045 A | 11/2008 | | |
| KR | 2012-0069933 A | 6/2012 | | |

\* cited by examiner

STEERING SYSTEM HAVING A RELUCTANCE BRAKE

CROSS REFERENCE TO RELATED APPLICATIONS

This application is a U.S. National Stage Entry of International Patent Application Serial Number PCT/EP2019/052159, filed Jan. 30, 2019, which claims priority to German Patent Application No. DE 10 2018 102 216.6, filed Feb. 1, 2018, the entire contents of both of which are incorporated herein by reference.

FIELD

The present disclosure generally relates to a steering system.

BACKGROUND

The present invention relates to a steering system having the features of the preamble of claim 1.

Electromechanical power steering systems in motor vehicles support the steering force which is applied by the driver. The steering force which the driver specifies by means of a steering wheel is directed into a torsion bar which rotates in a force-dependent fashion. This torque is measured by a sensor which passes on said information to an electronic control unit. This in turn provides the electric servomotor with precise commands as to which additional torque is to be applied to the steering system.

In the case of Steer-by-wire steering systems there is no direct mechanical coupling between the steering wheel and the steering gear, and the wheels of the vehicle are moved directly with the aid of a servomotor. The maximum lock angle of the steering wheel is therefore no longer defined by means of mechanical stops in the steering gear. However, the maximum mechanical steering angle lock of the wheels is nevertheless limited in steer-by-wire systems. It is therefore necessary to indicate to the driver when a maximum steering lock is reached. In the simplest case, a mechanical steering stop can be used which limits the maximum lock angle of the steering wheel to a specific angle (or to a predefined number of rotations).

Such steering stops are known, for example, from documents DE 10 2008 045 195 A1 and DE 10 2013 014 138 B3. Both documents disclose a sliding block which is guided in a slotted link and which moves into a mechanical block position when a predefined maximum movement is reached.

A disadvantage of such systems is that variable coupling between the lock angle of the steering wheel and the corresponding steering angle lock of a wheel is not possible. It is therefore desirable, for example, that a specific lock angle brings about a different steering angle lock in the case of slow travel than in the case of fast travel. This makes variable end stops necessary. For this purpose, various approaches to a solution are known in the prior art, including mechanically variable end stops such as, for example, in DE102013014135B3 and JP2008285045A.

Thus, a need exists for a variable end stop for use in a steering system, which end stop is of simple design.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a steering system.

According to the above, a steering system for motor vehicles is provided, comprising a steering actuator which acts on the steered wheels, is electronically controlled in accordance with a driver's steering request and acts on the steered wheels by means of a steering gear, and an actuator device which transmits reactions to a steering shaft which is connected to the steering wheel, wherein the steering system comprises a holding brake which can be activated electrically and can assume two positions. When a predefined rotational angle of the steering shaft is exceeded with respect to a housing which is fixedly connected to the vehicle, in a holding position the holding brake blocks rotation of the steering shaft with respect to the housing, and in an open position the holding brake releases rotation of the steering shaft with respect to the housing. The holding brake can therefore make available end stops for the steering system. These end stops are completely flexible, since the predefined rotational angle can be selected, for example, in accordance with the speed.

The actuator device has the function of providing the driver with feedback about the situation of the steering system and his surroundings. The intention is that the driver will, as it were, feel the road and the state of the steering system. Feedback can be provided through direct mechanical coupling of the wheels and of the steering wheel. The feedback is preferably provided by means of an electric feedback actuator, which in the case of mechanical coupling of the wheels and steering wheel can boost or superimpose the feedback, and in the case of steer-by-wire systems it simulates a feedback response without mechanical feedback. The holding brake is preferably a reluctance brake: in this context, the principle of minimization of a magnetic resistance is utilized. A magnetic system seeks to reduce magnetic resistance to increase the inductivity of the system. Reducing the size of an air gap via which a magnetic flux runs brings about a reduction in the magnetic resistance. This entails a lower energy level of the system. The force which attempts to reduce the magnetic resistance is referred to as reluctance force or Maxwellian force.

The reluctance force is used to block the steering shaft.

The holding brake is preferably embodied in such a way that when the holding brake is energized it assumes a holding position by minimization of a magnetic resistance between a first element, which is rotatably connected to the steering shaft, and a second element, which is fixedly connected to the housing. This has the advantage that in the switched-off state the brake does not have any friction or ripple. In addition, the brake does not lock as a result of icing up or swarf.

The coil bodies are energized with a single phase. This means that the same phase is applied to all the coil bodies. As a result, a control device for controlling the coil bodies can be a very simple design, since it requires only one output to the coil bodies.

The means of energizing the coil bodies can be of a non-controllable design. It may be advantageously sufficient to implement the control for the current in such a way that it can only be switched on or off. This has the advantage of a simple actuation circuit.

The holding force of the holding brake is preferably controllable, i.e. by means of the current strength and/or voltage. As a result, an adjustable holding force can be implemented. This can be consciously selected to be lower in an individual case than a torque which is input externally, e.g. via a steering wheel. As a result, rotation with ripples can be achieved, which can, for example, indicate an incorrect direction of rotation to the driver.

The holding brake is particularly preferably controlled in such a way that a soft steering stop can be implemented, so that e.g. the force which is applied by the holding brake rises slowly in the vicinity of the predefined maximum steering angle, and the maximum holding force is not reached until when the maximum steering angle is reached.

The current and/or voltage can be selected in accordance with the rotor position.

A rotating or rotatable element and stationary element have at least one pair of faces which are opposite one another or faces which are opposite one another in pairs and have profiling (profile pair). The profiling is provided on both faces. The profiling is preferably applied only on magnetically active parts. The profiling is preferably embodied in a complementary fashion. The holding brake can have one or more pairs of faces with profiling. As a result, a relatively large active magnetic area can be obtained.

The profiling is preferably embodied as a toothing arrangement. The number of teeth of each face of a pair of faces is preferably the same. In this way, when energization occurs, a large number of uniquely defined preferred positions with minimum reluctance is always available. The ratio of the number of teeth of one face to the other face of a pair of faces can, however, always be any integer. This permits the number of preferred positions to be easily adapted.

The pairs of faces with the profiling preferably run perpendicularly and/or horizontally and/or obliquely with respect to a rotational axis of the holding brake. In this way, adaptation to a large number of installation space situations is possible. The holding brake is preferably arranged coaxially with respect to the steering shaft.

The holding brake is preferably arranged in one housing together with the actuator device and as a result in a particularly space-saving fashion.

The holding brake preferably does not have more than three coil bodies, and preferably has two coil bodies, particularly preferably has precisely one coil body. A small number of coil bodies reduces the expenditure on manufacture.

The coil or the coils can run concentrically with respect to the rotational axis of the holding brake (annular coil). This is advantageous because annular coils can be pre-wound before insertion into a rotor or stator.

However, the coils can also be embodied as concentric windings about one stator foot each.

The holding brake has two elements, a rotating element and a stationary element. One of these two elements preferably does not have a coil body. This element is referred to below also as an element without a coil or a body without a coil. The other element preferably has at least one coil body. This element is also referred to below as an element or body with a coil.

The element with a coil can be embodied in one or more pieces. The element without a coil can be embodied in one or more pieces.

The element without a coil can be permanently magnetized or partially magnetized. It is also possible for only individual parts of the element which is without a coil and is embodied in multiple parts to be magnetized. The magnetization direction of the magnetic field can be perpendicular with respect to the rotational axis of the holding brake or else parallel thereto depending on the coil arrangement in a plane.

Additionally or alternatively to magnetization, the holding brake can also comprise permanent magnets.

Permanent magnetization increases the magnetic flux density of the system. In this way a higher energy density, and consequently a greater holding force, can be implemented.

Permanent magnetization of the holding brake also brings about preferred positions with minimum reluctance in the currentless state. The holding brake therefore has ripples. The holding brake can have an energization algorithm for compensating the ripples. In one embodiment, the holding brake has a holding ring which abuts against the steering shaft, an inner ring, which is connected in a rotationally fixed fashion to the steering shaft by means of the holding ring, and an outer ring, which surrounds the inner ring circumferentially and is connected to the housing. The holding brake therefore acts directly on the steering shaft via the holding ring. In this context, the outer or the inner ring have an iron ring with a U-shaped cross section, which has received a coil, which can be energized, in an annular groove. The respective other ring is preferably an iron ring which is rectangular in cross section. The inner ring has, on the outer face, and the outer ring has, on the inner face, a toothing arrangement, which toothing arrangements are complementary. The toothing arrangements do not engage in one another here. There is an air gap between the inner ring and the outer ring.

In a second embodiment, the holding brake has an inner ring with a U-shaped cross section and with an outer-circumferential and an inner-circumferential toothing arrangement, wherein a coil which can be energized is received in an annular groove between the limbs of the inner ring. In addition, the holding brake has an outer ring with a U-shaped cross section and with a toothing arrangement on the inner sides of both limbs, so that the inner ring is received between the two limbs of the outer ring, and two air gaps are available for minimizing the magnetic resistance. The available holding force of the holding brake can as a result be increased with respect to the first embodiment. In this case there can be provision that the inner ring which can be energized is connected to the housing, wherein the outer ring is attached to the steering shaft, or the inner ring which can be energized can be connected to the outside of the steering shaft, wherein the outer ring is then attached to the housing.

The embodiments have in common that the limbs of the rings which are formed with a U-shaped cross section preferably extend in the direction of the longitudinal axis of the steering shaft and are arranged concentrically with respect thereto. Furthermore, it is advantageous if the inner ring and the outer ring are generally formed from iron. The coil is preferably attached in the annular groove with a grouting agent. It is preferably energized by means of a control unit according to requirements. It is advantageous here if this control unit has a device, comprising a full bridge circuit, for demagnetizing the holding brake.

The use of the holding brake described above is particularly advantageous in a steer-by-wire steering system. Here, a steering stop can be formed in the feedback actuator using the holding device.

In addition to the application in steering systems, the braking and holding devices described above can also be used in other technological fields. In particular, such an electromagnetic braking and holding device comprises a stator and a rotor which are mounted in a rotational fashion with respect to one another. The stator and rotor have faces which are turned toward one another and which form a non-constant air gap through profiling. Either the stator or the rotor has here one or more coils, wherein the corresponding other coil is a body without a coil. All the coils are energized with a single phase. The coil or coils is/are designed to delay or block (reluctance brake) a relative movement between the stator and rotor when energization occurs.

In this way, it is possible to implement a variable end stop of the rotor with respect to the stator, which is of simple design.

The electromagnetic braking and holding device can be switched between an open position and a holding position, which block rotation in the holding position when a predefined rotational angle of the rotor with respect to the stator is exceeded, and release rotation between the stator and the rotor in the open position.

The braking and holding device preferably has a multiplicity of preferred positions, distributed over the circumference, with minimum reluctance only when energization occurs.

The electromagnetic braking and holding device can have a multiplicity of pairs of faces with profiling. The pairs of faces can be arranged horizontally and/or perpendicularly and/or obliquely with respect to the rotational axis of the rotor.

The electromagnetic braking and holding device preferably has precisely one single coil. This is preferably located concentrically around the rotational axis of the rotor.

The holding brake can be of modular design or can be used in a modular fashion. As a result, a desired holding force can be easily implemented by the multiple use of identical parts.

Figure 1:
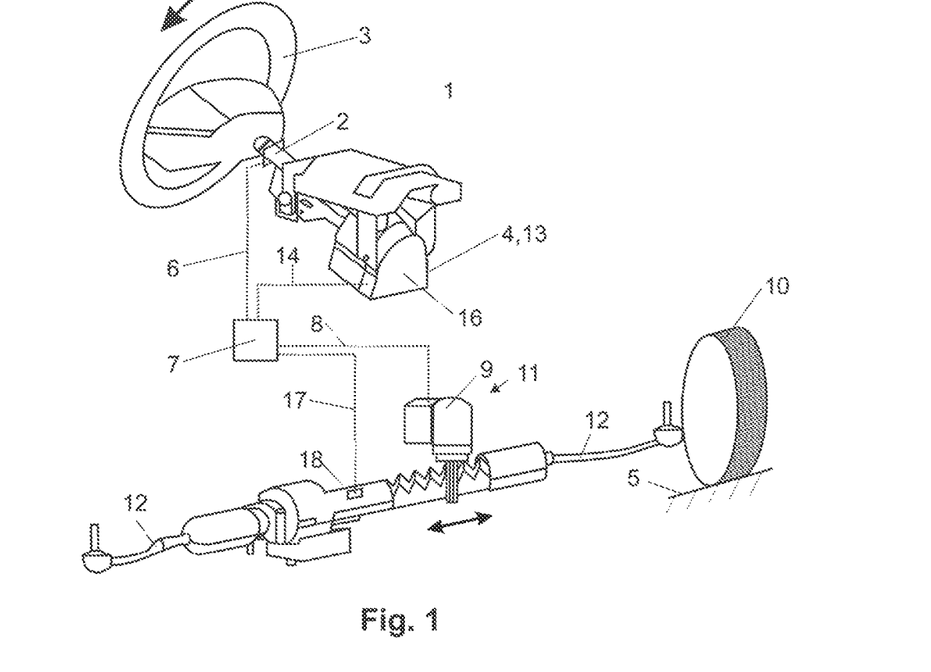
FIG. 1 is a schematic view of a steer-by-wire steering system.

FIG. 1 shows a steer-by-wire steering system 1. A rotational angle sensor (not illustrated) is attached to a steering shaft 2, which sensor detects the driver's steering angle which is applied by rotating a steering input means 3, which is embodied as a steering wheel in the example. However, it is additionally or alternatively also possible to register a steering toque. Furthermore, a feedback actuator 4 is attached to the steering shaft 2, which feedback actuator 4 serves to simulate the reactions of the roadway 5 on the steering wheel 3 and therefore to provide the driver with feedback about the steering and driving behavior of the vehicle. The driver's steering request is transmitted to a control unit 7 via the rotational angle a, measured by the rotational angle sensor, of the steering shaft 2 via signal lines 6. The control unit 7 transmits the driver's steering request via a signal line 8 to an electric steering actuator 9 which controls the position of the steered wheels 10. The steering actuator 9 acts indirectly on the steered wheels 10 via a steering-rod steering gear 11, such as for example a toothed rack steering gear, as well as via track rods 12 and other components. The control unit 7 preferably also performs the actuation of the feedback actuator 4 and the actuation of a holding brake 13 via a signal line 14. The holding brake 13 is designed to lock rotation of the steering shaft 2, i.e. it provides the necessary holding force to prevent rotation of the steering shaft 2, when a predefined rotational angle of the steering shaft 2 is exceeded. The holding brake 13 is preferably embodied integrally with the feedback actuator 4 in a common housing 16. The control unit 7 also receives signals of sensors 18 from the steering gear 11 via a signal line 17.

Figure 2:
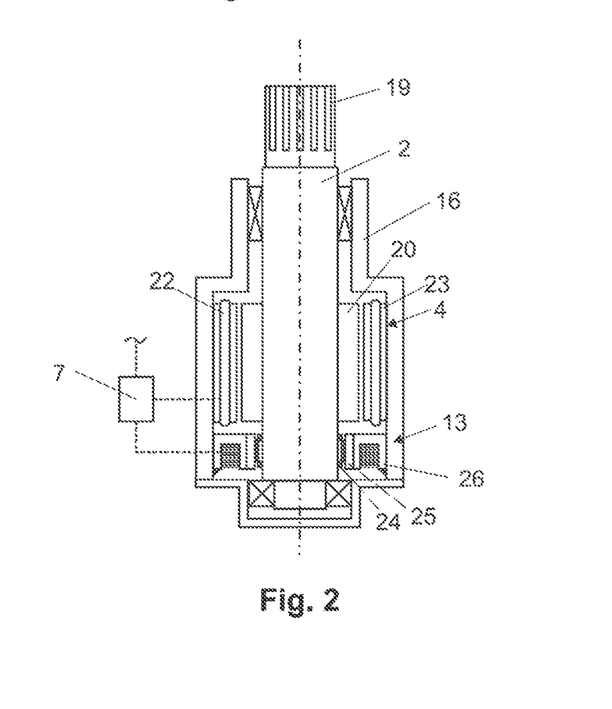
FIG. 2 is a schematic view of a reluctance brake with a current-excited stator.
Figure 3:
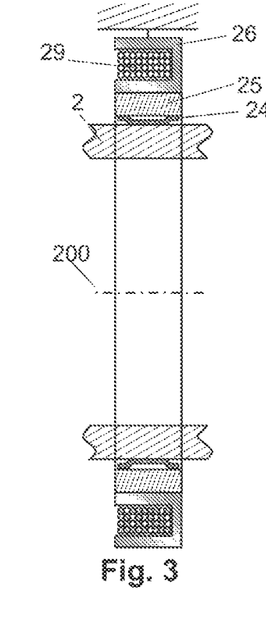
FIG. 3 is a longitudinal section and a cross sectional view of a reluctance brake in a holding position.

FIGS. 2 and 3 illustrate embodiments of the holding brake 13. The steering shaft 2 has, at one end, a receptacle 19 for attaching the steering shaft 2 to the steering wheel (not illustrated). The steering shaft 2 is rotationally arranged at the end near to the steering wheel and at the end remote from the steering wheel, in the housing 16. The housing 16 surrounds the feedback actuator 4 and the holding brake 13. The feedback actuator 4 has a rotor 20 which is connected in a rotationally fixed fashion to the steering shaft 2, and a stator 21 which surrounds the rotor 20, which rotor and stator are part of a servomotor. The stator 21 has a stator groove 22 which extends in a longitudinal section along the steering shaft 2 and in which the electrical windings 23 are inserted. The control unit 7 is connected to the feedback actuator 4 and actuates the energization of the windings 23. The holding brake 13 is arranged on the side of the feedback actuator 4 which is remote from the steering wheel. It surrounds the steering shaft 2 concentrically. The holding brake 13 has a holding ring 24 which abuts against the steering shaft 2 and which connects the steering shaft 2 in a rotationally fixed fashion to an inner ring 25. The inner ring 25 is surrounded by an outer ring 26 which is connected to the housing 16. The holding brake 13 operates according to the reluctance principle. The method of functioning of the holding brake 13 arises from the minimization of the magnetic resistance, also referred to as reluctance. The outer ring 26 (illustrated in the embodiment in FIGS. 2 to 5) has an iron ring which has a U-shaped cross section and has received a coil 28 in an annular groove 27. The limbs of the outer ring 26 extend here in the direction of the longitudinal axis 200 of the steering shaft 2 and are arranged concentrically with respect thereto. The coil 28 is preferably attached to a grouting agent in the annular groove 27. The turns 29 of the coil 28 run in the circumferential direction around the longitudinal axis 200 of the steering shaft 2. The turns 29 are preferably formed from copper wire. The outer ring 26 is connected to the control unit 7 and can be energized via it. The inner ring 25 is also an iron ring. The inner ring 25 has profiling 31 on the outer face 30, and the outer ring 26 has profiling 32 on its inner face 33. In the example, the pair of faces are configured with profiling in such a way that the profiling 31 and the profiling 32 are configured to correspond to one another.

Figure 4:
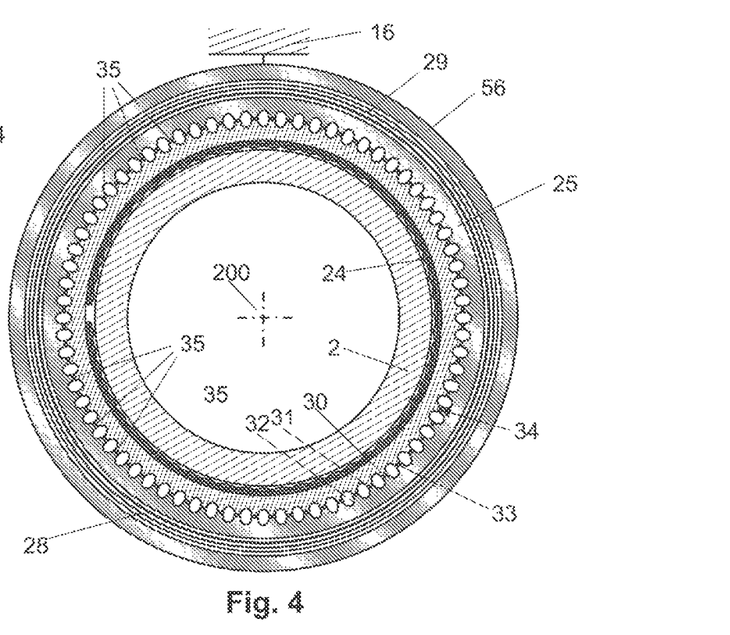
FIG. 4 is a longitudinal section and a cross sectional view of a reluctance brake in a holding position.
Figures 5, 6:
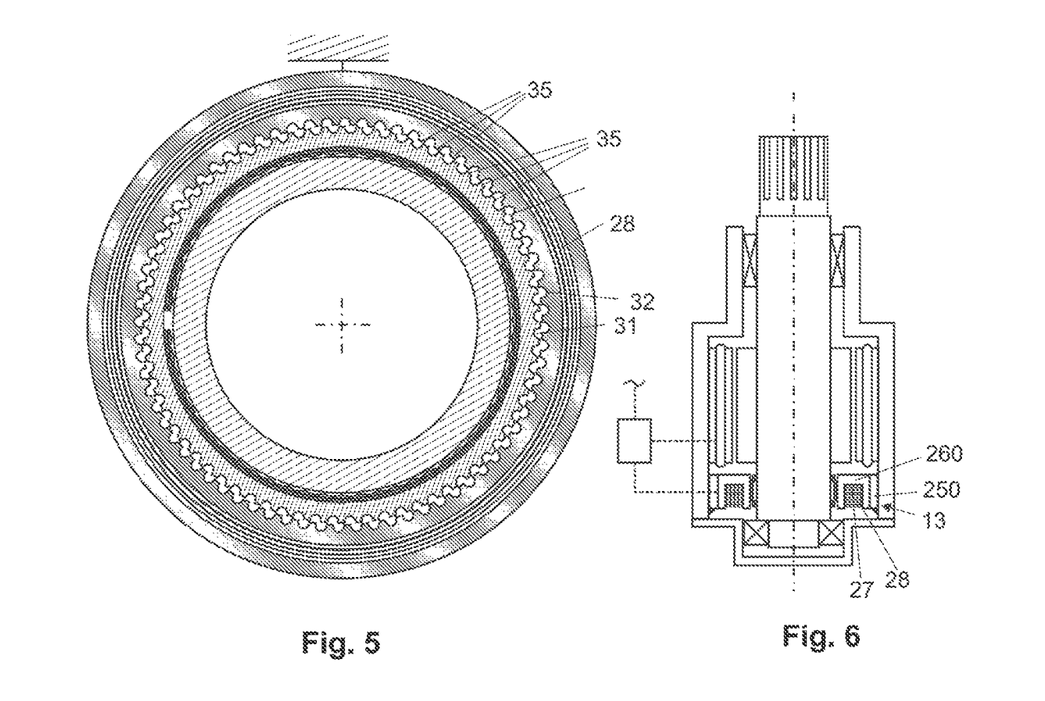
FIG. 5 is a cross sectional view of the reluctance brake shown in FIG. 3, in an open position.
FIG. 6 is a schematic view of a reluctance brake with a current-excited rotor.

An air gap 34 is provided between the outer ring 26 and the inner ring 25 so that the inner ring 25 can rotate with the steering shaft 2, while the outer ring 26 is held on the housing 16 in a positionally fixed fashion. The technically necessary air gap 34 is given the smallest possible dimensions. The profiling 31,32 preferably comprises teeth 35 which are preferably spaced apart evenly along the circumference of the inner ring 25 and outer ring 26 and extend parallel to the longitudinal axis 200 of the steering shaft 2. When the coil 28 is energized, closed paths of magnetic flux are produced between the inner ring 25 and the outer ring 26. The method of functioning of the holding brake 13 results from the minimization of the magnetic resistance, also referred to as reluctance. The reluctance force arises at the surface between two materials with different permeability (e.g. iron and air). The resulting reluctance force acts in such a way that it wishes to reduce the difference in reluctance. When the coil 28 is energized, the inner ring 25 therefore turns in the outer ring 26 until the reluctance is minimal. In which situation, the magnetic resistance along the paths is then lowest if the air gap 34 between the inner ring 25 and the outer ring 26 is minimal. As illustrated in FIG. 5, the reluctance is minimal if the teeth 35 of the inner ring 25 and of the outer ring 26 are located opposite one another. When the reluctance is minimal, the holding force is so large that the rotation of the steering shaft 2 is blocked. The holding position of the holding brake 13 is illustrated in FIG. 4.

The control unit 7 also has a device for demagnetizing the reluctance brake 13. A full bridge circuit is preferably provided for this in the control unit 7. The magnetic flux between the inner ring 25 and the outer ring 26 is interrupted through demagnetization. The braking effect of the holding brake 13 is therefore cancelled and the inner ring 25 can rotate freely with the steering shaft 2. FIG. 5 shows an opened state of the holding brake 13.

The holding brake 13 illustrated in FIG. 6 corresponds in terms of the principle to the embodiment described above. The difference is that the inner ring 250 of the holding brake 13 is an iron ring with a U-shaped cross section which has received a coil 28 in an annular groove 27. In this case, the inner ring 250, connected in a rotationally fixed fashion to the steering shaft, of the holding brake 13, and not the outer ring 260 which is an iron ring with a rectangular cross section, is energized.

In order to increase the holding force, the holding brake 13 can have an inner ring 251 which is connected to the housing 16 and has an outer-circumferential and inner-circumferential toothing arrangement 36,37 and an outer ring 261 which is complementary thereto, in the shape of a U with a toothing arrangement 38,39 on the inner sides of the two limbs. This embodiment with two air gaps 40,41 between the inner ring 251 and the outer ring 261 is illustrated in FIGS. 7 to 13. It is also referred to as a "double rotor".

Figure 7:
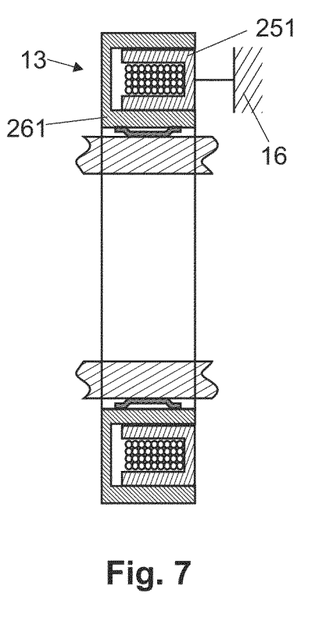
FIG. 7 is a longitudinal sectional view of a reluctance brake which is embodied as a double rotor.
Figure 8:
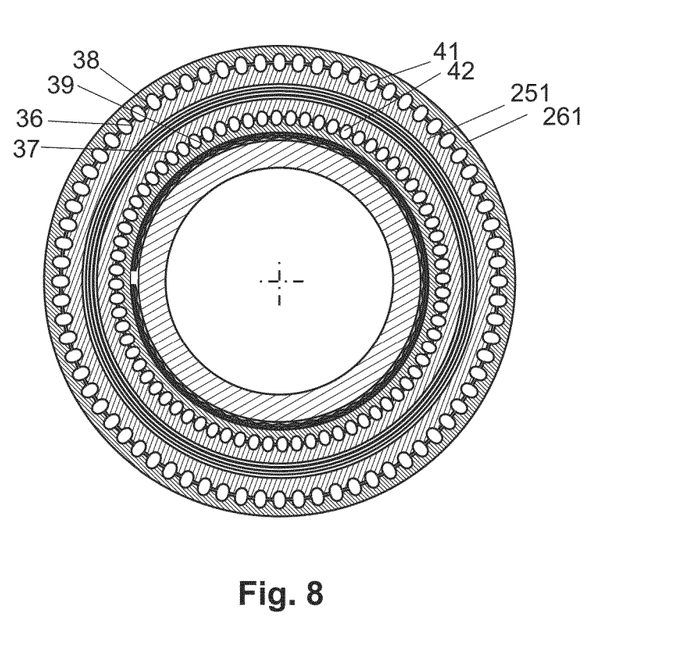
FIG. 8 is a cross sectional view of the reluctance brake in FIG. 7 in a holding position.
Figure 9:
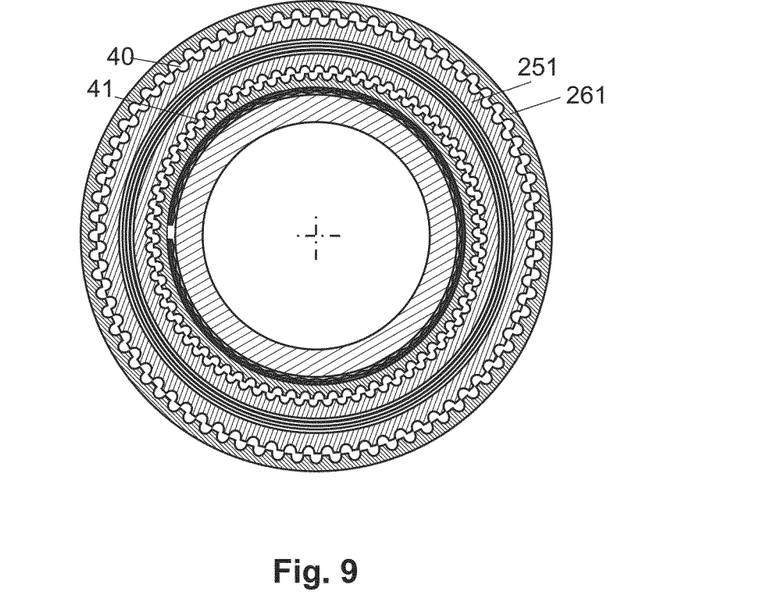
FIG. 9 is a cross sectional view of the reluctance brake in FIG. 7 in an open position.

In FIGS. 7 to 9, the inner ring 251 has an iron ring with a coil. Energization of the inner ring 251 brings about minimization of the magnetic resistance between the inner ring 251 and the outer ring 261. The outer ring 261 covers the inner ring 251 on the side near to the annular groove. The inner ring 251 is therefore completely received in the outer ring 261. An air gap 40,41 is formed in each case between a limb of the inner ring 251 and a limb of the outer ring 261. The profiling or toothing arrangement on the two rings 251,261 is embodied in such a way that the position of the pairs of teeth of the first air gap 40 and the position of the pairs of teeth of the second air gap 41 are synchronous, i.e. if the pairs of teeth of the first air gap 40 are opposite one another, the pairs of teeth of the second air gap 41 are also simultaneously opposite one another. In FIG. 8, the holding brake 13 is illustrated in the holding position. FIG. 9 shows an open position of the holding brake 13.

Figure 10:
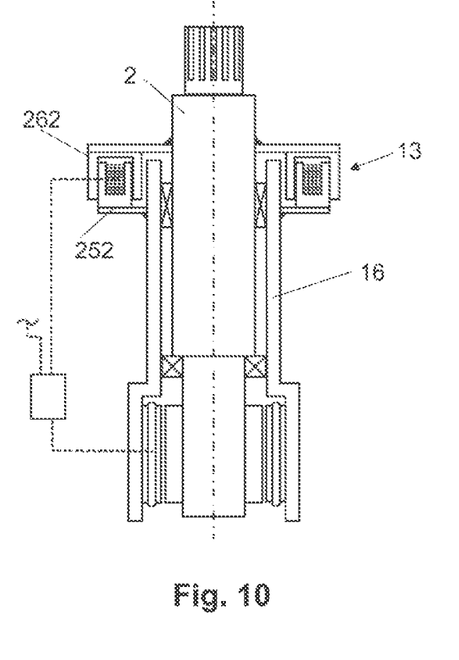
FIG. 10 is a schematic view of a steering-wheel-side reluctance brake with a current-excited inner ring as a stator.
Figure 11:
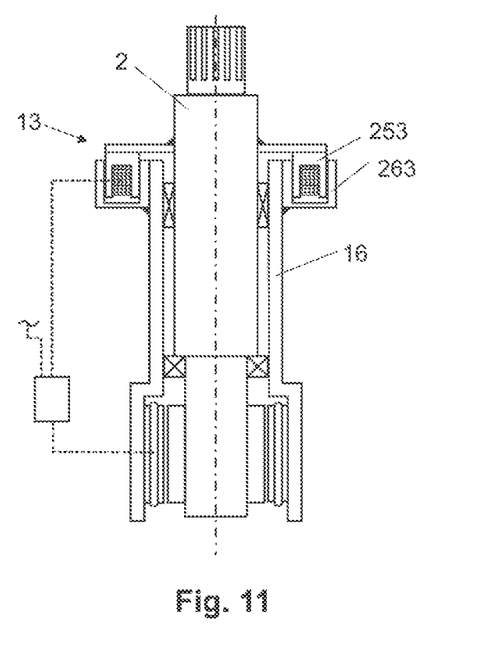
FIG. 11 is a schematic view of a steering-wheel-side reluctance brake with a current-excited inner ring as a rotor.

FIGS. 10 and 11 show two embodiments of a holding brake 13 with a double rotor, wherein the holding brake 13 is arranged at the steering-wheel-side end of the steering shaft 2. In FIG. 10, the outer ring 262 is attached to a steering shaft 2. The inner ring 252 which can be energized is connected to the housing 16. In contrast, in FIG. 11 the inner ring 253 which can be energized is connected to the outside of the steering shaft 2, and the outer ring 263 is attached to the housing 16.

Figure 12:
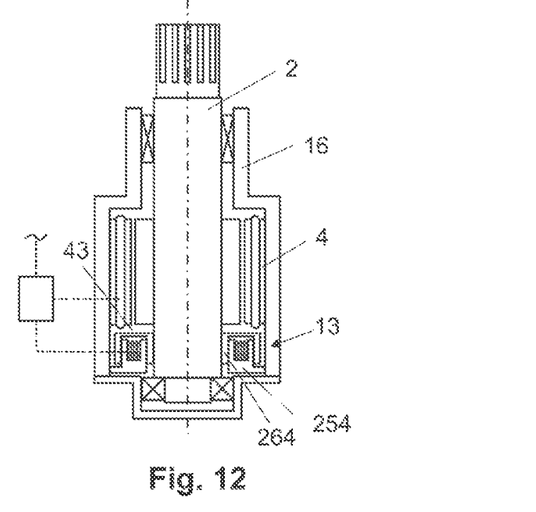
FIG. 12 is a schematic view of a reluctance brake, remote from the steering wheel, with a current-excited inner ring as a stator.
Figure 13:
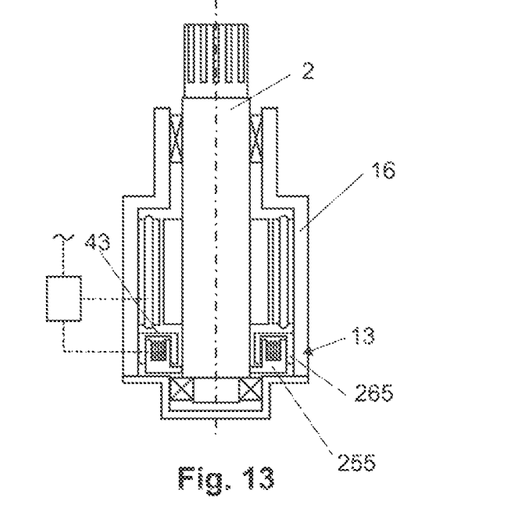
FIG. 13 is a schematic view of a reluctance brake, remote from the steering wheel, with a current-excited inner ring as a rotor.

In FIGS. 12 and 13, two embodiments of a holding brake 13 with a double rotor are illustrated, wherein the holding brake 13 is arranged at that end of the steering shaft 2 which is remote from the steering wheel. The inner ring 254 which can be energized is connected to the housing 16 in FIG. 12, and the outer ring 264 is attached to the steering shaft 2. In contrast, in FIG. 13 the inner ring 255 which can be energized is connected to the outside of the steering shaft 2, and the outer ring 265 is connected to the housing 16. Since the holding brake is arranged in both cases in the direct vicinity of the feedback actuator 4, the outer ring 264,265 points away with its open side from the feedback actuator 4. The inner ring 254,255 therefore lies on the side which is remote from the feedback actuator in the outer ring 264,265. In this case, the rear wall 43 of the outer ring 264,265 protects the holding brake 13 against electromagnetic fields which are generated by the feedback actuator 4.

Figure 14A:
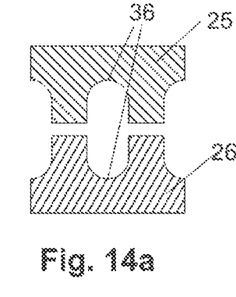
FIGS. 14a-d are views of tooth shapes.
Figure 14B:
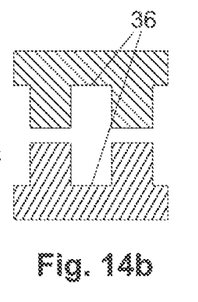

FIGS. 14a-d show different tooth shapes for use in a reluctance brake. In FIGS. 14a,b, a flat toothing arrangement of an inner ring 25 and an outer ring 26 is shown in outline, wherein in FIG. 14a the tooth face 36 is embodied in a round fashion, while in FIG. 15b it is embodied in a flat fashion.

Figure 14C:
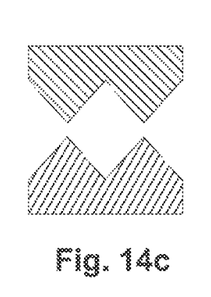
Figure 14D:
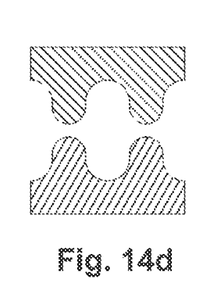

In FIG. 14c a pointed tooth arrangement is present. In FIG. 14d a corrugated toothing arrangement.

FIGS. 15a-17c show various embodiments of reluctance brakes in cross section, wherein a complete illustration has been dispensed with. Accordingly, in each case only one half of a complete cross section can be seen.

Figure 15A:
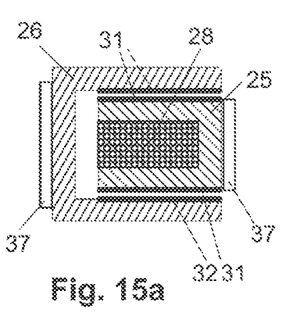
FIG. 15a is a cross sectional view of an embodiment of a reluctance brake with a U-shaped coil carrier.

FIG. 15a illustrates a U-in-U shape, as has already been described above in more detail in the statements relating to the "double rotor". The reluctance brake has a stationary part 26 and a rotating part 25, wherein one of these parts comprises a coil 28 which can be energized. The role of the parts as stationary or rotating can be basically interchanged. The rotational axis (not shown) is located in the horizontal of the plane of the drawing, underneath or else above the illustrated cross-sectional half, that is to say parallel to the limbs of the U-shaped parts. The parts have profiling 31,32 (pair of faces with profiling), on selected sides facing one another, there being an air gap presented between profiling 31 and profiling 32. The attachment of the parts to, for example, a steering shaft or a housing is indicated here by means of holding parts 37. The holding parts are each attached here to the outside of the U-shaped parts 25,26. Another position of the holding parts is conceivable. The holding parts are preferably made of non-magnetic material, while the parts 25, 26 are made of magnetic material.

The statements made with respect to FIG. 15a apply basically also to the following explanations in respect of drawings 15b-17c, so that only the most important differences are discussed.

Figure 15B:
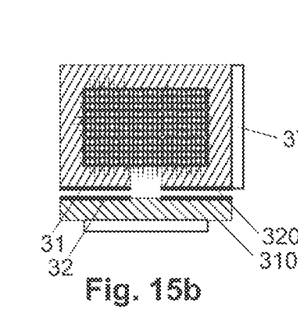
FIG. 15b is a cross sectional view of an embodiment of a reluctance brake with a U-shaped coil carrier.

FIG. 15b shows an extended U-in-I shape in which one part is constructed in a U shape and the other part is constructed in an I shape. The groove which forms the U shape is for the most part closed off at its opening. Therefore, there are two different profiling pairs 31,32 and 310,320, which can be embodied in the same way or in different ways.

Figure 15C:
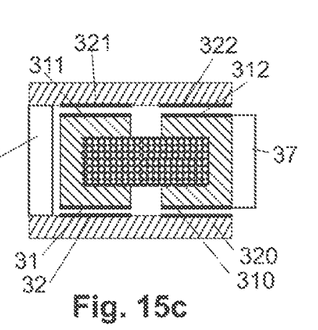
FIG. 15c is a cross sectional view of an embodiment of a reluctance brake with a U-shaped coil carrier.

FIG. 15c shows a double C-in-double-I shape, which in contrast to FIG. 15b has a third and fourth profiling pair 311,321 and 312,322.

Figure 16A:
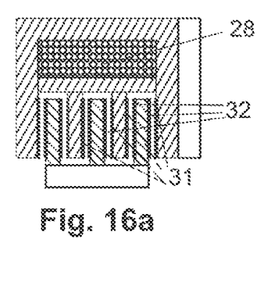
FIG. 16a is a cross sectional view of an embodiment of a reluctance brake with laminations.
Figure 16B:
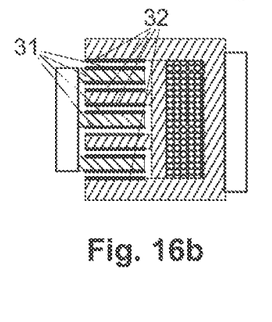
FIG. 16b is a cross sectional view of an embodiment of a reluctance brake with laminations.

FIG. 16a shows a variant in which the profiling pairs 31,32 are embodied in the manner of a lamination. The profiling pairs are embodied perpendicularly with respect to the rotational axis of the reluctance brake. FIG. 16b shows a variant in which, in contrast to FIG. 16a, the profiling pairs 31,32 do not extend perpendicularly but rather parallel to the rotational axis.

Figure 17A:
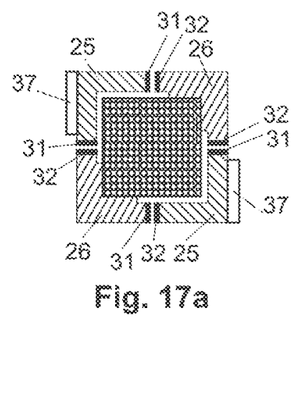
FIGS. 17a-c are cross sectional views of an embodiment of a reluctance brake with oblique components.
Figure 17B:
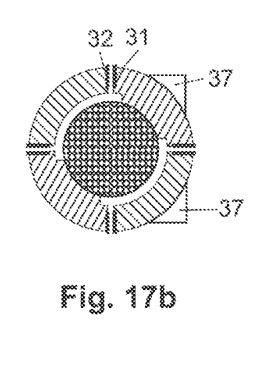
Figure 17C:
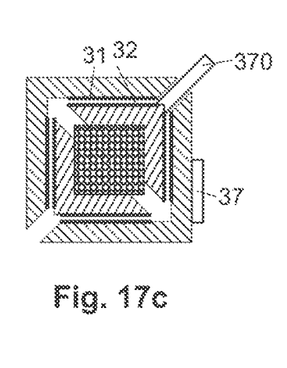

FIGS. 17a-c show variants with a stationary part and/or rotational part which are/is divided diagonally with respect to the rotational axis. This generates profiling pairs in at least two planes, here parallel and perpendicular with respect to the rotational axis. Another position, for example oblique position of the profiling pairs with respect to the rotational axis is possible. FIG. 17a shows a double L-in-double-L variant. FIG. 17b shows a variant with a round design. FIG. 16c shows a double L-in-double-L shape in which the inner part is secured by means of a holding part which is made to extend outward through the outer part 370.

Figure 18:
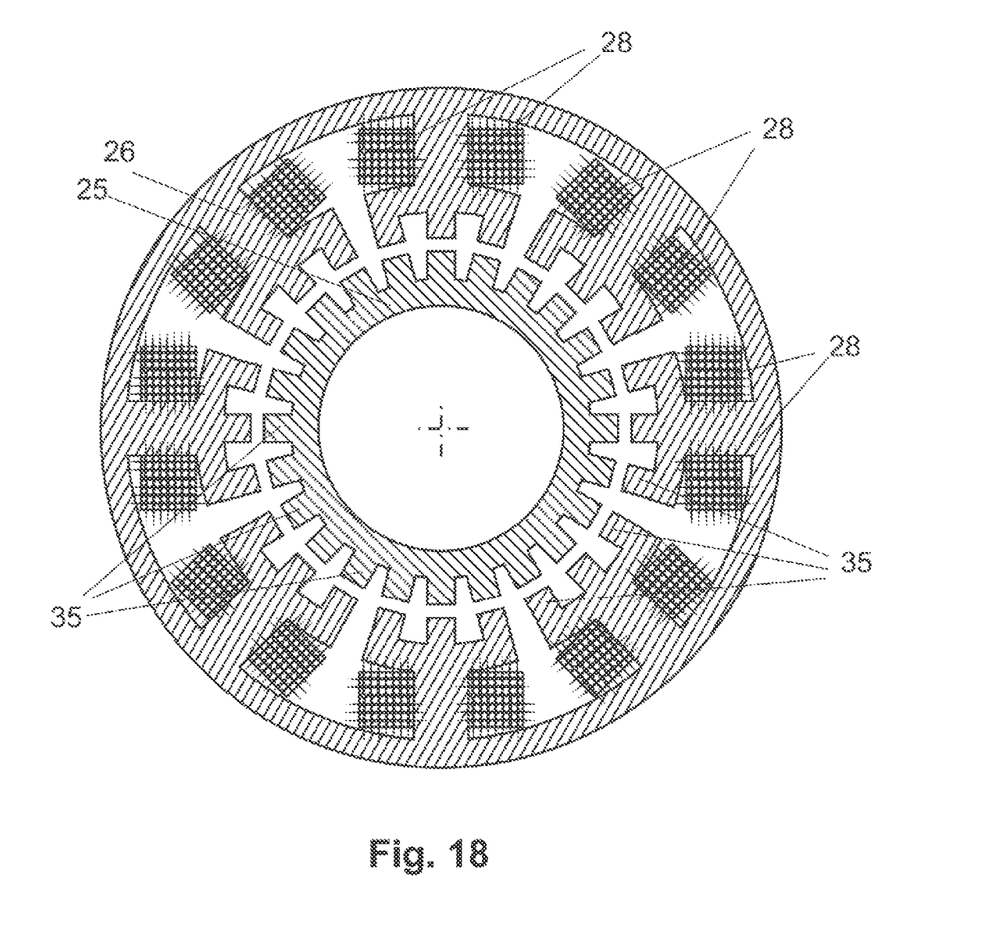
FIG. 18 is a cross sectional view of a further embodiment of a reluctance brake.

FIG. 18 shows the reluctance brake which is related to the stepping motor and has a corresponding number of teeth 35 of the rotating part 25 and stationary part 26. As in the case of stepping motors, the stationary part has a multiplicity of coil bodies 28 which can be energized. In contrast to the previous embodiments, this embodiment has, by virtue of the multiplicity of coils, specific magnetic poles in the part 26. There are no active poles in the part 25. All the coil bodies are energized with the same current, i.e. with a single phase, when activation occurs.

The method of functioning arises in a way analogous to the functioning of stepping motors and reluctance brake. However, with this design there is, in contrast to stepping motors, no possibility of active rotation between the rotating part and stationary part, owing to the same number of teeth. Said design acts as a pure holding brake.

In all the embodiments there can be provision for the winding of the holding brake to be embodied in a redundant fashion.

The number and the shape of the teeth of the inner ring and the outer ring can be different.

In the double rotor variant, the tooth positions are preferably asynchronous, i.e. the pairs of teeth of the first air gap overlap, the pairs of teeth of the second air gap do not overlap or only do so slightly. This increases the number of possible latching positions without increasing the number of teeth.

The holding brake can generally be provided inside or outside the housing.

The shape of the teeth is not restricted to the shapes illustrated. Teeth can have a corrugated shape, be pointed or flat, or have a mixed shape of these types or some other special shape.

The standing part and the rotating part are preferably fabricated by powder-metallurgical means. They are composed, for example, from non-insulated, powder-metallurgical substances, for example powder-metallurgically magnetic substances, powder-metallurgically soft-magnetic substances, sintered magnetic substances, sintered soft-magnetic substances. However, they can also be composed of fully or partially insulated powder-metallurgical substances, such as for example non-sintered soft-magnetic substances (e.g. glass crystalline multifunction substances (GCM) or soft-magnetic composites (SMC)) or injection molding plastic with a high proportion of magnetic powder.

The non-magnetized parts, for example holding parts or fasteners consist e.g. of copper, aluminum or a polymer substance.

The coil material can preferably be aluminum or copper.

What is claimed is:

1. A steering system for motor vehicles, comprising:
   a steering actuator configured to act on steered wheels of a vehicle, is electronically controlled based on a steering request and is configured to act on the steered wheels through a steering gear and a feedback actuator that transmits feedback forces, based on forces acting on the steered wheels, to a steering shaft connected to a steering wheel, and
   an electrically activatable holding brake which is configured to switch between an open position and a holding position, wherein the holding brake is configured to block rotation of the steering shaft in the holding position when a predefined rotational angle of the steering shaft with respect to a housing coupled to the motor vehicle is exceeded, and to release rotation of the steering shaft with respect to the housing in the open position, wherein the holding brake and the feedback actuator are arranged together in the housing.

2. The steering system of claim 1 wherein the holding brake is a reluctance brake.

3. The steering system of claim 2 wherein the holding brake is configured such that when energized the holding brake assumes the holding position by minimization of a magnetic resistance between a first element, which is rotatably connected to the steering shaft, and a second element, which is fixedly connected to the housing.

4. The steering system of claim 1 wherein the holding brake comprises one or more coils energized in a single phase.

5. The steering system of claim 4 comprising a control unit configured to control the energization of the one or more coils.

6. The steering system of claim 4 wherein the holding brake has no more than three coil bodies.

7. The steering system of claim 1 wherein the holding brake has precisely one pair of faces or a multiplicity of pairs of faces with profiling.

8. The steering system of claim 1 wherein a body without a coil is magnetized or partially magnetized.

9. The steering system of claim 1 wherein the holding brake has a holding ring which abuts against the steering shaft, an inner ring which is connected in a rotationally fixed fashion to the steering shaft by means of the holding ring, and an outer ring which surrounds the inner ring circumferentially and which is connected to the housing.

10. The steering system of claim 9 wherein the outer ring or the inner ring has an iron ring which is U-shaped in cross section and has received a coil, which is configured to be energized, in an annular groove.

11. The steering system of claim 1 wherein the holding brake has an inner ring with a U-shaped cross section and an outer-circumferential and inner-circumferential toothing arrangement, wherein a coil which is configured to be energized is received in an annular groove between limbs of the inner ring, and wherein the holding brake has an outer ring which has a U-shaped cross section and a toothing arrangement on inner sides of both limbs, so that the inner ring is received between the two limbs of the outer ring, and two air gaps are available for minimizing the magnetic resistance.

12. The steering system of claim 11 wherein the inner ring is connected to the housing, wherein the outer ring is attached to the steering shaft, or the inner ring is connected to the outer side of the steering shaft, wherein the outer ring is attached to the housing.

13. The steering system of claim 1 wherein the steering gear and the input means are, as a steer-by-wire system, not mechanically coupled.

14. A steering system for motor vehicles, comprising:
a steering actuator configured to act on steered wheels of a vehicle, is electronically controlled based on a steering request and is configured to act on the steered wheels through a steering gear and a feedback actuator that transmits feedback forces, based on forces acting on the steered wheels, to a steering shaft connected to a steering wheel, and
an electrically activatable holding brake which is configured to switch between an open position and a holding position, wherein the holding brake is configured to block rotation of the steering shaft in the holding position when a predefined rotational angle of the steering shaft with respect to a housing coupled to the motor vehicle is exceeded, and to release rotation of the steering shaft with respect to the housing in the open position,
wherein the holding brake has precisely one pair of faces or a multiplicity of pairs of faces with profiling,
wherein the pair or multiplicity of pairs of faces with profiling extend one or more of horizontally, perpendicularly, or obliquely with respect to the rotational axis of the holding brake.

15. The steering system of claim 14 wherein the holding brake is a reluctance brake.

16. The steering system of claim 14 wherein the holding brake is configured such that when energized the holding brake assumes the holding position by minimization of a magnetic resistance between a first element, which is rotatably connected to the steering shaft, and a second element, which is fixedly connected to the housing.

17. The steering system of claim 14 wherein the holding brake has a holding ring that abuts against the steering shaft, an inner ring that is connected in a rotationally fixed fashion to the steering shaft by means of the holding ring, and an outer ring that surrounds the inner ring circumferentially and that is connected to the housing.

18. A steering system for motor vehicles, comprising:
a steering actuator configured to act on steered wheels of a vehicle, is electronically controlled based on a steering request and is configured to act on the steered wheels through a steering gear and a feedback actuator that transmits feedback forces, based on forces acting on the steered wheels, to a steering shaft connected to a steering wheel, and
an electrically activatable holding brake which is configured to switch between an open position and a holding position, wherein the holding brake is configured to block rotation of the steering shaft in the holding position when a predefined rotational angle of the steering shaft with respect to a housing coupled to the motor vehicle is exceeded, and to release rotation of the steering shaft with respect to the housing in the open position,
wherein the holding brake comprises one or more coils energized in a single phase,
wherein the steering system comprises a control unit configured to energize the one or more coils and the control unit includes a device for demagnetizing the holding brake which comprises a full-bridge circuit.

19. The steering system of claim 18 wherein the holding brake has an inner ring with a U-shaped cross section and an outer-circumferential and inner-circumferential toothing arrangement, wherein a coil which is configured to be energized is received in an annular groove between limbs of the inner ring, and wherein the holding brake has an outer ring which has a U-shaped cross section and a toothing arrangement on inner sides of both limbs, so that the inner ring is received between the two limbs of the outer ring, and two air gaps are available for minimizing the magnetic resistance.

20. The steering system of claim 18 wherein the holding brake is a reluctance brake.

* * * * *